(12) United States Patent
Walker et al.

(10) Patent No.: US 11,282,068 B2
(45) Date of Patent: Mar. 22, 2022

(54) SYSTEMS AND METHODS FOR FACILITATING TRANSACTIONS IN OPEN LOOP AND CLOSED LOOP NETWORKS

(71) Applicant: C2GO GAMING, INC., Las Vegas, NV (US)

(72) Inventors: Scott Walker, Las Vegas, NV (US); Craig Libson, Hartsdale, NY (US); Andrew DeMaio, Las Vegas, NV (US)

(73) Assignee: Flexia Payments LLC, Las Vegas, NV (US)

( * ) Notice: Subject to any disclaimer, the term of this patent is extended or adjusted under 35 U.S.C. 154(b) by 964 days.

(21) Appl. No.: 14/883,560

(22) Filed: Oct. 14, 2015

(65) Prior Publication Data

US 2016/0104149 A1 Apr. 14, 2016

Related U.S. Application Data

(60) Provisional application No. 62/063,887, filed on Oct. 14, 2014.

(51) Int. Cl.
| | |
|---|---|
| *G06Q 40/06* | (2012.01) |
| *G06Q 20/34* | (2012.01) |
| *G06Q 20/26* | (2012.01) |
| *G06Q 50/34* | (2012.01) |

(52) U.S. Cl.
CPC ........... *G06Q 20/349* (2013.01); *G06Q 20/26* (2013.01); *G06Q 50/34* (2013.01)

(58) Field of Classification Search
CPC ....... G06Q 20/349; G06Q 20/26; G06Q 50/34

USPC .................................. 705/39, 44; 463/25
See application file for complete search history.

(56) References Cited

U.S. PATENT DOCUMENTS

| | | | | |
|---|---|---|---|---|
| 2004/0049452 | A1* | 3/2004 | Blagg | G06Q 20/04 705/39 |
| 2007/0203832 | A1* | 8/2007 | Babi | G06Q 20/40 705/39 |
| 2007/0214080 | A1* | 9/2007 | Babi | G06Q 30/06 705/39 |
| 2014/0141866 | A1* | 5/2014 | Irwin, Jr | G07F 17/3244 463/25 |
| 2014/0379562 | A1* | 12/2014 | Olson | G07F 17/3244 705/39 |
| 2016/0132876 | A1* | 5/2016 | Petersen | G06Q 20/227 705/44 |

FOREIGN PATENT DOCUMENTS

KR 100880673 B1 * 2/2009

OTHER PUBLICATIONS

Refka Abdellaoui, Marc Pasquet, Secure Communication for Internet Payment in Heterogeneous Networks, Apr. 1, 2010, IEEE, web, 1085-1092 (Year: 2010).*

* cited by examiner

*Primary Examiner* — I Jung Liu
(74) *Attorney, Agent, or Firm* — Newman Law, LLC

(57) ABSTRACT

Systems and methods for facilitating e-commerce transactions by providing systems and methods for executing transactions in both an open loop and closed loop networks.

11 Claims, 2 Drawing Sheets

US 11,282,068 B2

SYSTEMS AND METHODS FOR FACILITATING TRANSACTIONS IN OPEN LOOP AND CLOSED LOOP NETWORKS

CROSS-REFERENCE TO RELATED APPLICATION

This application claims priority to and the benefit of U.S. Provisional Patent Application Ser. No. 62/063,887 filed Oct. 14, 2014, the entire contents of which is incorporated herein by reference.

BACKGROUND OF THE INVENTION

The invention relates to systems and methods of providing, facilitating, conducting and administering electronic transactions, and in particular, transactions involving the electronic transfer of funds between parties and accounts in a closed loop network and transactions involving parties in an open loop network, some of which involve using a debit card.

Electronic payments have largely become the preferred means for conducting consumer transactions around the world. Instead of using cash, consumers are using many different types of cards to buy a wide range of items. These consumer card types include credit, debit and prepaid cards.

These types of cards have several drawbacks. First, the cards are typically only offered in connection with a relationship with a bank, merchant or retail store. Second, these cards have limits but are generally not reloadable, even if prepaid, thus requiring customers to purchase only up to their limits, add money to an account or buy additional prepaid cards when the value associated with the original card is depleted. Finally, these cards are not flexible enough in their capabilities to be used in every environment or for every kind of transaction, particularly transactions between parties which have been traditionally, and remain up to now, made with cash, such as referral fees, tips and commissions.

Accordingly, there is a need for systems and methods which can overcome these deficiencies and others found in the art.

SUMMARY OF THE INVENTION

The invention is directed to systems and methods which resolve the aforementioned issues in the art, among other things.

Some embodiments of the invention are directed to a system for facilitating e-commerce transactions, comprising: a) an application module configured to receive user data and an electronic signature on relevant tax forms, the receipt of user data facilitating the issuance of at least one member financial account to a user, wherein the member financial account is accessible for the transfer of funds to a plurality of members within a closed loop network of members and linked to a user debit card, wherein the debit card is enabled for use in an open loop network; b) a transaction processing module configured to receive transaction instructions relating to the transfer of funds from a member financial account to one or more different member financial accounts of members of the plurality of members; and c) a reporting module for providing notification of transactions to members, wherein the transaction information is stored in memory.

In some embodiments of the aforementioned system, the application module provides a graphical user interface accessible through a global communication network.

In some embodiments of the aforementioned system, the transaction processing module provides a graphical user interface accessible through a global communication network.

In some embodiments, the aforementioned system further comprises a data communication device configured to communicate notification of transactions.

In some embodiments, the aforementioned system further comprises a processing device configured to facilitate the transfer of funds from the member financial account pursuant to the instructions received.

Some embodiments of the invention are directed to a system for facilitating e-commerce transactions, comprising: a) an application module configured to receive user data, the receipt of user data facilitating the issuance an open loop member financial account and a closed loop member financial account to a user, the closed loop member account being enabled by a closed loop operator for the use of funds therein in one or more closed loop transactions, each closed loop transaction being required to satisfy preset criteria of characteristics associated with the transaction, wherein both the open loop member financial account and the closed loop member financial account are linked to a user debit card, the open loop member financial account being enabled for the use of funds therein in one or more open loop transactions, the open loop transactions differing from the closed loop transactions; b) a transaction processing module configured to receive transaction instructions relating to the transfer of funds from an open loop member financial account issued to a member to a closed loop member financial account issued to the member, wherein the transaction instructions are received through a user input device with a currency acceptor; and c) a reporting module for providing notification to the closed loop operator of the transfer of funds to the closed loop member financial account.

In some embodiments of the aforementioned system, the application module provides a graphical user interface accessible through a global communication network.

In some embodiments of the aforementioned system, the transaction processing module provides a graphical user interface accessible through a global communication network.

In some embodiments, the aforementioned system further comprises a data communication device configured to communicate notification of transactions.

In some embodiments, the aforementioned system further comprises a processing device configured to compare each closed loop transaction with preset criteria of characteristics, wherein transactions are executed responsive to the satisfaction of the preset criteria.

In some embodiments of the aforementioned system, the preset criteria of characteristics set forth transactions involving the purchase of credit for use in a casino game, wherein the purchase results in a corresponding decrease in the funds in the closed loop member account.

In some embodiments of the aforementioned system, the preset criteria of characteristics set forth transactions involving the redemption of credit in a casino game, wherein the redemption results in a corresponding increase in the funds in the closed loop member account.

BRIEF DESCRIPTION OF THE FIGURES

The components in the figures are not necessarily to scale, emphasis instead being placed upon illustrating the prin

DETAILED DESCRIPTION OF THE INVENTION

Throughout the specification and claims, the following terms take at least the meanings explicitly associated herein, unless the context dictates otherwise. The meanings identified below do not necessarily limit the terms, but merely provide illustrative examples for the terms.

The term "open loop" as used herein may refer to a multi-party system which operates by connecting an issuing financial institution with an acquiring financial institution for purposes of electronically transferring money from the issuing financial institution to the acquiring financial institution, unless the context dictates otherwise. Open loop networks may include cards such as credit cards, debit cards, prepaid debit cards and certain prepaid stored value cards, among other things, and may be activated by an open loop processor with respect to a particular purchaser or consumer.

The term "closed loop" as used herein may refer to a network in which payment services are provided directly to network members, such as merchants and cardholders, by the operators of the network without involving third party financial institution intermediaries. Closed loop networks may include prepaid stored value cards and limited purpose cards which can only be used by network members.

The meaning of "a," "an," and "the" may include plural references, and the meaning of "in" may include "in" and "on." The phrase "in one embodiment," as used herein does not necessarily refer to the same embodiment, although it may.

Various embodiments are enabled by the invention, including embodiments related to a system and method for providing a closed loop card for use in transferring monies between network members through an application interface which is also configured for use as an open loop card. The closed loop card of such embodiments may be loadable and reloadable by network members, assigned to or otherwise indicative of a particular network member and activated as a prepaid stored value card by an open loop processor and issuing financial institution.

Figure 1:
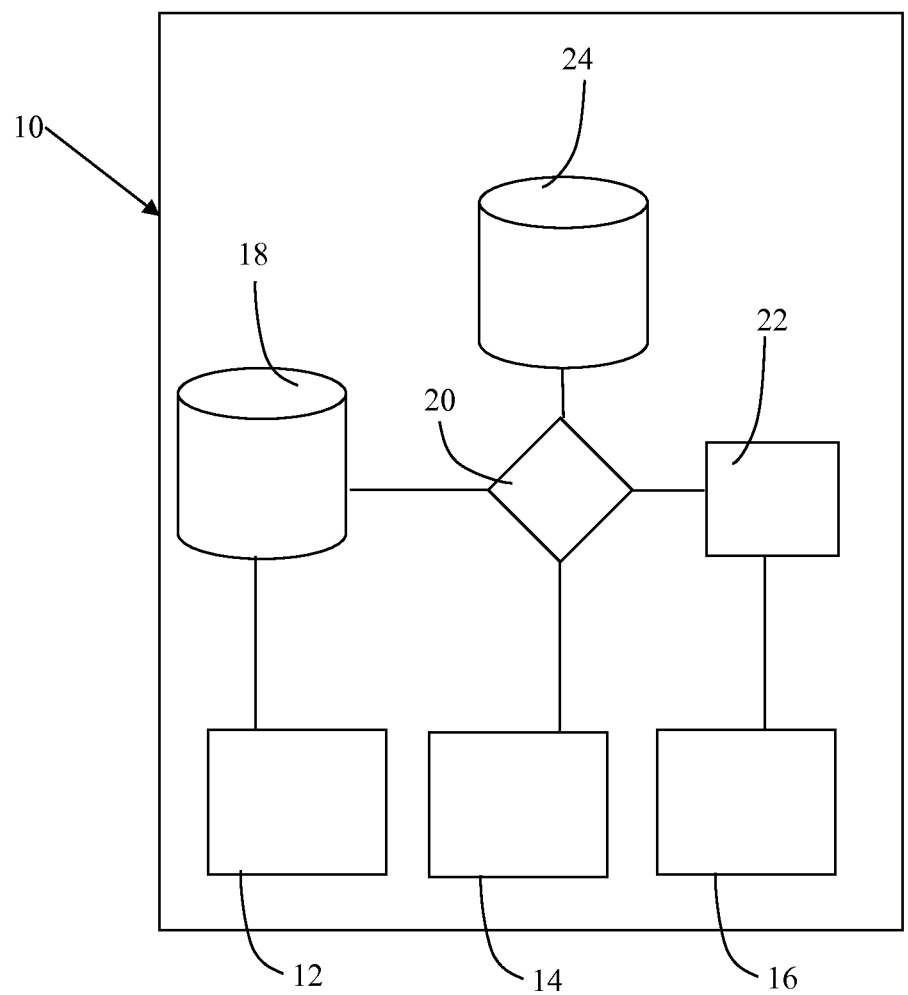
- FIG. 1 is a block diagram illustrating some of the components of an exemplary system constructed in accordance with the invention.

Referring to FIG. 1, a high-level schematic is shown of a system configured in accordance with an exemplary embodiment of the invention which is generally referred to as system 10. System 10 comprises an application module 12, a transaction processing module 14 and a reporting module 16. In this embodiment or other embodiments, system 10 may include additional, fewer, or different modules for various applications. Conventional components such as network interfaces, security mechanisms, load balancers, failover servers, management and network operations consoles, and the like are not shown so as to not obscure the details of the system, but are contemplated as additional components of system 10.

System 10 is configured to provide, or causes to be provided, various user interfaces between system 10 modules 12, 14 and 16 and one or more devices, which could comprise desktop computers, laptop computers, tablet computers, e-readers, mobile/smart phones, gaming devices, personal digital assistants, televisions, and other network-enabled media devices configured for communicating over a communication network such as the internet or other similar area networks through a wireless or hardwire connection, or a mixture thereof. These devices are not shown in order to simplify and clarify the description, but it is contemplated that thousands or more of such devices could be communicating over a network with system 10. Further, there may be multiple systems 10 in communication with each other and working together to provide the functionality of system 100 as described herein.

The user interfaces provided by system 10 can be any type of user interface, such as a graphical user interface (GUI) or a web-based user interface (WUI), which may include data entry fields and drop-down menus as appropriate.

Application module 12 provides a user interface to enable a user or network member to register, login and submit personal data which is stored in a user database 18. In this embodiment, an electronic signature for entering in an electronic or virtual W-9 form to be stored in database 18 is also obtained from any users registering to become payees or cardholders. It should be understood that database 18 may comprise one or more databases, such as a cardholder database, a merchant database and a W-9 database.

Personal data submitted through application module 12 is processes by a data processing device 20 and transmitted via data communication device 22 for approval and issuance of a physical card and network member account at a financial institution. The network member account information may be stored in a database maintained by the financial institution. The card may be a prepaid debit card rather than a credit card which is capable of receiving funds to a network member account either from network members or other sources, such as processors that accept debit or credit cards or through direct bank deposits or transfers, and is preferably also associated with an issuing financial institution for use as an open loop card. The card may include a magnetic stripe, integrated circuit or chip that enables use of the card with associated card reading technology in closed loop and open loop systems. The approval process may be automated by a system not shown herein which performs all necessary know your customer due diligence or other reviews prior to issuing a card and account.

Transaction processing module 14 provides a user interface which enables network members, such as merchants and cardholders, to identify other network members, such as card holders for the purpose of initiating a payment or transfer of funds to the identified network member. For example, a nightclub may wish to provide a payment to a taxi driver or promoter in return for bringing a customer to the nightclub. Transaction processing module 14 may be connected with database 18 to permit searching for cardholders based on various criteria, such as name or job type for example. Processing device 20 facilitates the search and retrieval of results responsive to the search query which are transmitted for display on the user interface via data communication device 22. Once the payee cardholder is identified, payment can be entered and processed through transaction processing module 14 for transfer to the identified network member's account. The funds transferred are now available for use either by using the card associated with the identified member's account or through a similar transfer by accessing transaction processing module 14. Thus, further to the aforementioned example, the taxi driver may transfer a portion of the payment from the nightclub to another network member, such as the doorman who directed the passenger who became a customer of the nightclub to the taxi driven by the taxi driver.

Transactions entered through transaction processing module 14 are stored in a transaction database 24. In this embodiment, transactions involving use of the card in the open loop system are not stored in transaction database 24. It should be understood, however, that system 10 can have access to the network member account for purposes of confirming that sufficient funds are available to complete the entered transaction prior to execution thereof by transaction processing module 14.

Reporting module 16 provides notifications of transactions, which may be made to any device pursuant to specifications made by each network member, such as through e-mail, SMS or MMS, or by accessing a user interface provided by reporting module 16. Reporting module 16 also provides each network member with details of any transactions involving the network member which are stored in transaction database 24 and W-9 form details or other reporting information. In the aforementioned example, the nightclub would have information regarding the payment to the taxi driver readily available for inclusion in its tax returns. Likewise, the taxi driver would be able to obtain tax reporting information for the amount paid to the doorman.

Use of the card, including loading the card with funds or making payments or transfers may result in fees to be charged to the network members.

Figure 2:
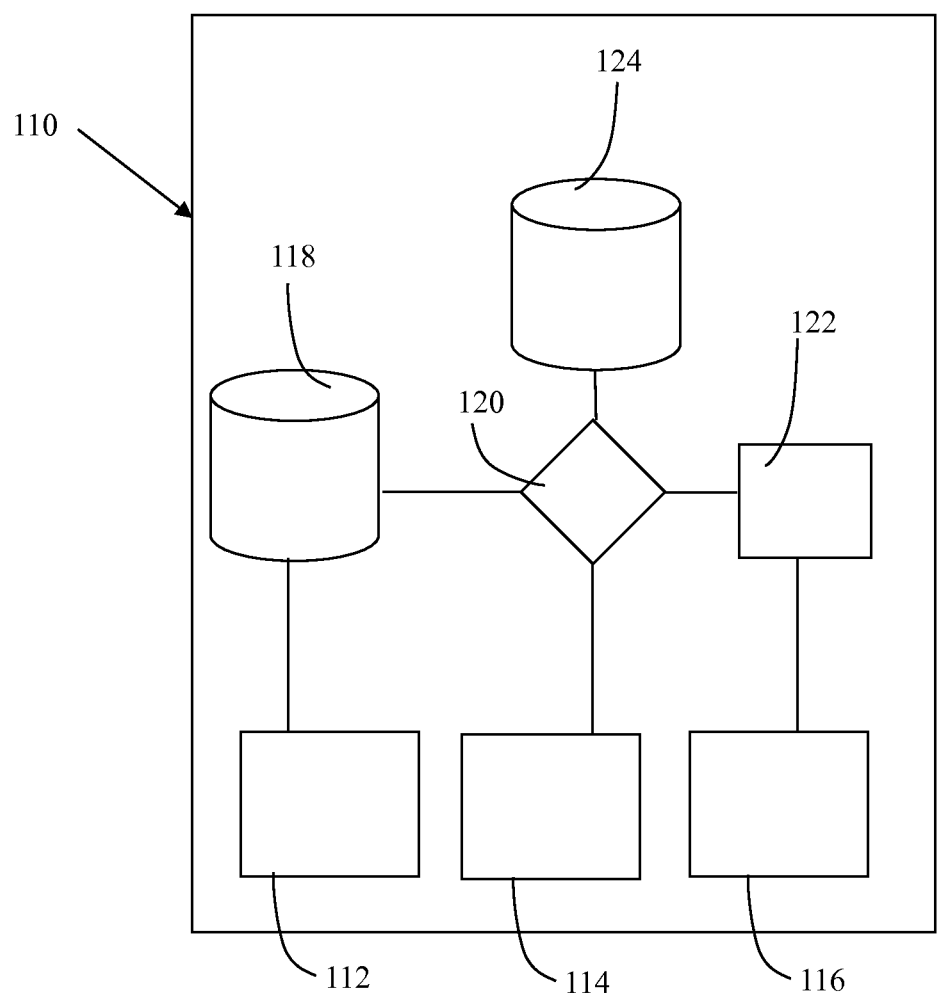
FIG. 2 is a block diagram illustrating some of the components of another exemplary system constructed in accordance with the invention.

FIG. 2 illustrates a system 110 constructed in accordance with another exemplary embodiment of the invention in which independent closed loop and open loop accounts are formed.

System 110 may include an application module 112 which is accessible by users or casino personnel receiving information directly from a potential cardholder. In this embodiment, once approved a cardholder may be issued multiple accounts, including an open loop account issued by an issuing financial institution and an independent closed loop network account issued by the issuing network member or its financial institution receiving the application through application module 112. Cardholders may access transaction processing module 114 for purposes of transferring funds between the closed loop and open loop accounts. Transactions relating to the closed loop network account may be controlled in that each transaction must meet a certain criteria to be executed.

System 110 may be particularly configured and adapted for use in connection with regulated casino gaming with the casino issuing the closed loop network account and this will be discussed herein below as a non-limiting example.

The closed loop account established by a casino, or alternatively, the casino's financial institution, may be maintained for transactions limited in characteristics or type. For example, in such a gaming account, transactions may be limited to only transactions occurring within the casino or further limited to gaming transactions occurring in the casino such as the purchase and redemption of gaming machine credits or gaming chips for use at live gaming tables at the casino. In other words, used for participating in games, such as for example, slot machines, electronic gaming machines, table games like blackjack and poker, etc. Transactions may further be limited by monetary amount or frequency, such as total amount lost or won per day, amount of wagers placed, amount of transfers in or out of the gaming account, etc. System 110 processing device 120 may be used to facilitate a comparison of each transaction impacting the gaming account with preset criteria for permitting such transactions to proceed to execution, with any transaction failing to satisfy the preset criteria being denied.

Cardholders may add funds directly to either the open loop or closed loop gaming account. In some embodiments, adding funds to the gaming account may be executed at the casino by submitting money at kiosks, the casino cage or through a user input device connected with or mounted on a gaming machine or gaming table. Money in the gaming account may be managed, reconciled and applied if available by the casino management system. The user input device may include a card reading device, bill acceptor, touchscreen or keypad for facilitating the transfer of funds from an open loop account or non-gaming account to the gaming account or the receipt of currency to be applied to the gaming account. It should be readily apparent that security measures may be employed to ensure the identity of the cardholder, such as the requirement to enter a unique code or pin number. The user input device may be in part or whole the same or a modified version of the hardware device currently used by gaming machines to accept funds for gaming credit.

Cardholders may also at any time or place access a user interface provided by transaction processing module 114 for the purpose of transferring funds between the open loop account (or another non-gaming account) and the gaming account. Once the transfer is confirmed through the user interface by the user, the funds are transferred and the processor transmits transaction information through data communication device 122 to the casino management system for application of the changes to the gaming account to reflect the transfer. In this embodiment transaction data for closed loop transactions are stored in transaction database 124. Reporting module 116 handles the reporting of transfers as well as any other reporting requirements.

Use of the card in transactions involving the open loop account may be processed and managed based on conventional debit/prepaid card methodology and processing entities. Use of the card for either open loop or closed loop transactions, including loading either of the accounts with funds, transferring funds between accounts, making payments, etc. may result in fees to network members.

It should be understood that systems disclosed herein may include control programs containing one or more instruction sets or rules which may be written in a conventional computing language such as HTML, C++ or Java, for coordinating the interactive and functional relationship between databases, processors and data communication devices.

Processors as disclosed herein may include microprocessors, microcomputers, microcontrollers, digital signal processors, central processing units, state machines, logic circuitries and/or any other devices that manipulate signals and data based on computer-readable instructions. Databases disclosed herein can include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Modules disclosed herein may include routines, programs, objects, components, and data structures, which perform particular tasks or may also be implemented as, signal processor(s), state machine(s), logic circuitries, and/or any other device or component that manipulate signals based on computer-readable instructions. Among other capabilities, the processors disclosed herein may retrieve and execute computer-readable instructions stored in one or more of the databases disclosed herein.

In the foregoing description, numerous specific examples and details are set forth in order to provide a more thorough description of the invention. Thus, it will be apparent to one skilled in the art, that the invention may be practiced without at least some of the specific details provided herein. In other instances, well-known features have not been described in detail so as not to obscure the invention.

The functionality and principles of the embodiments disclosed herein are best implemented by or with software programs, instructions and applications, operating in connection with computer hardware, such as data input/output devices, data processing devices and data storage devices, which may be within the same housing or independent and connected remotely. It is expected that one of ordinary skill, notwithstanding the many design choices motivated by, for example, available time, current technology, and economic considerations, when guided by the concepts and principles disclosed herein will be readily capable of generating such software and selecting appropriate hardware with minimal experimentation. Therefore, in the interest of brevity and minimization of any risk of obscuring the principles and concepts according to this embodiment of the invention, further discussion of such software and hardware, if any, will be limited to the essentials with respect to the principles and concepts used by the preferred or exemplary embodiments.

Some embodiments of the invention are directed to systems and methods as described above which are wholly or partially provided through downloadable applications and may be supported, enabled or facilitated through components that may include various computer and network related software and hardware, that is, programs, operating systems, memory storage devices, data input/output devices, data processors, servers with links to data communication systems, wireless or otherwise, such as those which take the form of a local or wide area network, and a plurality of data transceiving terminals capable of interfacing with the network, such as personal computers, handheld devices, PDAs, cell phones or any other devices capable of displaying a user interface.

Those skilled in the art will appreciate that the particular types of communication network and devices, software and hardware are not vital to the full implementation of the embodiments described herein or other embodiments within the scope and spirit of the invention. It should be understood that the type of communication network and devices, software and hardware may also vary based on the rapid advances in technology that are ongoing in the industry. In other words, the precise software and hardware configuration of the various embodiments of the invention may vary accordingly while still remaining within the scope and spirit of the invention.

Although this description discloses exemplary embodiments including, among other components, software executed on hardware, it should be noted that the embodiments are merely illustrative and should not be considered as limiting. For example, it is contemplated that any or all of the hardware and software components may be embodied exclusively in hardware, exclusively in software, exclusively in firmware, or in any combination of hardware, software, and/or firmware. Accordingly, certain embodiments may be implemented in other ways. Furthermore, well known process steps and computer components may have not been described in detail herein in order to avoid unnecessarily obscuring the underlying concepts.

Some portions of the disclosure are presented in terms of algorithms (e.g., as represented in flowcharts, prose descriptions, or both) and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations or transformation of physical quantities or representations of physical quantities as modules or code devices, without loss of generality. However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," "determining," or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware, or hardware, and when embodied in software, could be downloaded to reside on and be operated from different platforms used by a variety of operating systems. The embodiments can also be in a computer program product, which can be executed on a computing system.

Some embodiments also relate to an apparatus for performing the operations herein. Such an apparatus may be specially constructed for the purposes, e.g., a specific computer, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be a transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for the purposes of enablement and best mode.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the disclosure of the invention herein and as set forth in the claims and equivalents thereto.

The invention claimed is:

1. A specialized debit card user system for enabling both closed loop and open loop transactions using the same user debit card, including one or more data processing devices in communication with memory and one or more data communication devices, the system comprising:

a) a single, physical user debit card having a magnetic stripe and a chip disposed on the same single, user debit card;
   b) a closed loop operator data transceiving terminal, the closed loop operator data transceiving terminal being located at a casino, the closed loop operator data transceiving terminal including an application module executed by the one or more processing devices, the application module residing in the closed loop operator data transceiving terminal, the closed loop operator data transceiving terminal being in communication with the one or more data communication devices, the application module being configured to receive user data transmitted to the closed loop transceiving terminal through the one or more data communication devices, the receipt of user data by the closed loop transceiving terminal actuating the closed loop operator data transceiving terminal to execute: the generation and issuance of the single, physical user debit card for a user; the creation of an open loop member financial account stored in a database associated with an open loop operator and the chip disposed on the single, physical user debit card; and the creation of a corresponding closed loop member financial account stored in a database associated with a closed loop operator and the magnetic stripe disposed on the single, physical user debit card, wherein the open loop member account and the corresponding closed loop member financial account are operatively associated with one another by the closed loop operator transceiving terminal and the single, physical user debit card, the operative association being established through the application module residing in the closed loop operator transceiving terminal;
   c) a transaction processing module residing in the closed loop operator data transceiving terminal configured to receive transaction data from a plurality of card reading devices, the transaction processing module enabling execution of the transaction responsive to the transaction data first satisfying preset criteria, the preset criteria specifying that a user initiated transaction is one of the following transactions: (i) a closed loop transaction, wherein the closed loop transaction involves the detection of the magnetic stripe only by a card reading device of an electronic gaming machine in a casino and is limited to the transfer of funds from the closed loop member financial account to credit stored on the electronic gaming machine for use in the play of games on the electronic gaming machine, (ii) an open loop transaction, wherein the open loop transaction involves the detection of the chip only by a card reading device associated with the open loop operator, (iii) a deposit of funds to one of the closed loop member financial account or the open loop member financial account, or (iv) a transfer of funds from the open loop member financial account operatively associated with the single, physical user debit card to the corresponding closed loop member financial account operatively associated with the single, physical user debit card, and wherein the transaction module prevents the execution of any transaction which is not one of (i), (ii), (iii) or (iv), and wherein the transaction data for the transfer of funds of (iv) is executed by the transaction module responsive only to the depositing of funds directly into, from or between the open loop member financial account and the closed loop member financial account without an intermediary receiving any of the transferred funds, the transferred funds to the closed loop member financial account being immediately enabled for use by the single, physical user debit card in the closed loop transactions and the transferred funds to the open loop member financial account being immediately enabled for use by the same single, physical user debit card in the open loop transactions; and
   d) a reporting module stored in one or more databases by the closed loop operator, the reporting module being executed by the one or more processing devices and configured to provide notification through the one or more data communication devices to a data communication device associated with the closed loop operator, the notification to the closed loop operator including the transaction data received relating to the user initiated transactions involving the transfer of funds from the open loop member financial account to the closed loop member financial account.

2. The system as recited in claim 1, wherein the application module provides a graphical user interface accessible through a global communication network.

3. The system as recited in claim 1, wherein the transaction processing module provides a graphical user interface accessible through a global communication network.

4. The system as recited in claim 1, further comprising a data communication device configured to communicate notification of transactions.

5. The system as recited in claim 1, further comprising a processing device configured to compare each closed loop transaction with preset criteria of characteristics, wherein transactions are executed responsive to the satisfaction of the preset criteria.

6. The system as recited in claim 1, wherein the preset criteria of characteristics set forth transactions involving the purchase of credit for use in a casino game, wherein the purchase results in a corresponding decrease in the funds in the closed loop member account.

7. The system as recited in claim 1, wherein the preset criteria of characteristics set forth transactions involving the redemption of credit in a casino game, wherein the redemption results in a corresponding increase in the funds in the closed loop member account.

8. A specialized debit card user system for enabling both closed loop and open loop transactions using the same user debit card, including one or more data processing devices in communication with memory and one or more data communication devices, the system comprising:

a) a closed loop operator data transceiving terminal located at a casino including an application module residing in the terminal executed by the one or more processing devices, the closed loop operator data transceiving terminal being in communication with the one or more data communication devices, the application module being configured to receive user data through the one or more data communication devices, the receipt of user data facilitating the issuance of an open loop member financial account and a corresponding closed loop member financial account to a user, the open loop member account and closed loop member account being operatively associated with one another, the closed loop member account being enabled and stored in one or more databases by a closed loop operator for the use of funds in one or more closed loop transactions, each closed loop transaction being enabled only by the magnetic stripe on the single, one physical user debit card being detected by a card reading device on an electronic gaming machine, wherein the closed loop transaction involving the electronic gaming machine is limited to the transfer funds from a closed loop member account to credit for play stored on the electronic gaming machine, wherein both the open loop member financial account and the closed loop member financial account are linked by the application module to a single, one physical user debit card, the single, one physical user debit card being enabled to execute transactions debiting the closed loop member financial account and execute transactions debiting the open loop member financial account, the closed loop member financial account being operatively associated with a magnetic stripe disposed on the single, one user debit card and configured to access the closed loop member financial account, the open loop member financial account being operatively associated with a chip disposed on the single, one user debit card and configured to access the open loop member financial account, wherein the open loop member financial account is enabled for the use of funds therein in one or more open loop transactions and disabled for use with the one or more electronic gaming machines;

b) a transaction processing module executed by the one or more processing devices, the transaction processing module executed by the one or more processing devices being configured to receive transaction instructions from the one or more communication devices, the transaction instructions relating to the transfer of funds from an open loop member financial account issued to a member to a closed loop member financial account issued to the member, wherein the transfer of funds between the open loop member financial account and the closed loop member financial account is executed responsive to the receipt of the transaction instructions, the transfer of funds being made directly between the open loop member financial account and the closed loop member financial account and transferred without an intermediary receiving any of the funds being transferred, and wherein the transaction instructions are received through a user input device with a currency acceptor; and c) a reporting module stored in the one or more databases by the closed loop operator, the reporting module transmitting notification to a data communication device associated with the closed loop operator, the notification including the transaction instructions received relating to the transfer of funds to the closed loop member financial account.

9. The system as recited in claim 8, wherein the application module provides a graphical user interface accessible through a global communication network.

10. The system as recited in claim 8, wherein the transaction processing module provides a graphical user interface accessible through a global communication network.

11. The system as recited in claim 8, wherein each closed loop transaction is enabled only for use with one or more electronic gaming machines identified as being provided by the closed loop member.

* * * * *